United States Patent [19]

Barber

[11] 4,323,046

[45] Apr. 6, 1982

[54] DUAL FUEL SYSTEM FOR AUTOMOBILES

[76] Inventor: Stanley Barber, 3310 S. 27th St., Fort Smith, Ark. 72901

[21] Appl. No.: 794,099

[22] Filed: May 5, 1977

[51] Int. Cl.³ .................... F02M 13/06; F02M 31/18
[52] U.S. Cl. .................................. 123/575; 123/1 A; 123/557
[58] Field of Search ............... 123/1 A, 3, 121, 122 E, 123/127, 133, 34 A, 179 G, 180 EH, 575, 576, 577, 578, 525

[56] References Cited

U.S. PATENT DOCUMENTS

| | | | |
|---|---|---|---|
| 801,390 | 10/1905 | Low | 123/575 X |
| 807,391 | 12/1905 | Low | 123/575 X |
| 2,075,330 | 3/1937 | Angell, Jr. et al. | 123/127 |
| 2,381,304 | 8/1945 | Merrill | 123/575 X |
| 2,444,665 | 7/1948 | Oberbeck | 123/575 X |
| 2,643,647 | 6/1953 | Meyer et al. | 123/575 X |
| 3,713,429 | 1/1973 | Dwyre | 123/127 |
| 3,851,633 | 12/1974 | Shih | 123/575 |
| 3,931,801 | 1/1976 | Rose et al. | 123/133 X |
| 4,019,477 | 4/1977 | Overton | 123/127 |
| 4,056,087 | 11/1977 | Boyce | 123/127 |

FOREIGN PATENT DOCUMENTS 2717761 11/1977 Fed. Rep. of Germany ...... 123/576
338750 3/1936 Italy ..................................... 123/127

*Primary Examiner*—Leonard E. Smith
*Attorney, Agent, or Firm*—Lowe, Kokjer, Kircher, Wharton & Bowman

[57] ABSTRACT

For an automobile with a gasoline fuel system wherein fuel is delivered by a fuel pump from the gas tank to a carburetor and on to the engine through an intake manifold, a substitute non-petroleum fuel system including a storage tank from which liquid fuel is pumped to an atmospherically maintained vaporization tank fitted with a heating coil. Mixed air and fuel vapors, the flow being regulated through a second accelerator, are fed directly from the vaporization tank to the intake manifold of the engine. The vapor tank is also equipped with an electrical resistance heater to facilitate engine starts. An alternative embodiment teaches mechanical linkage and circuitry for selectively operating either the gas or substitute fuel system through a single accelerator pedal.

6 Claims, 13 Drawing Figures

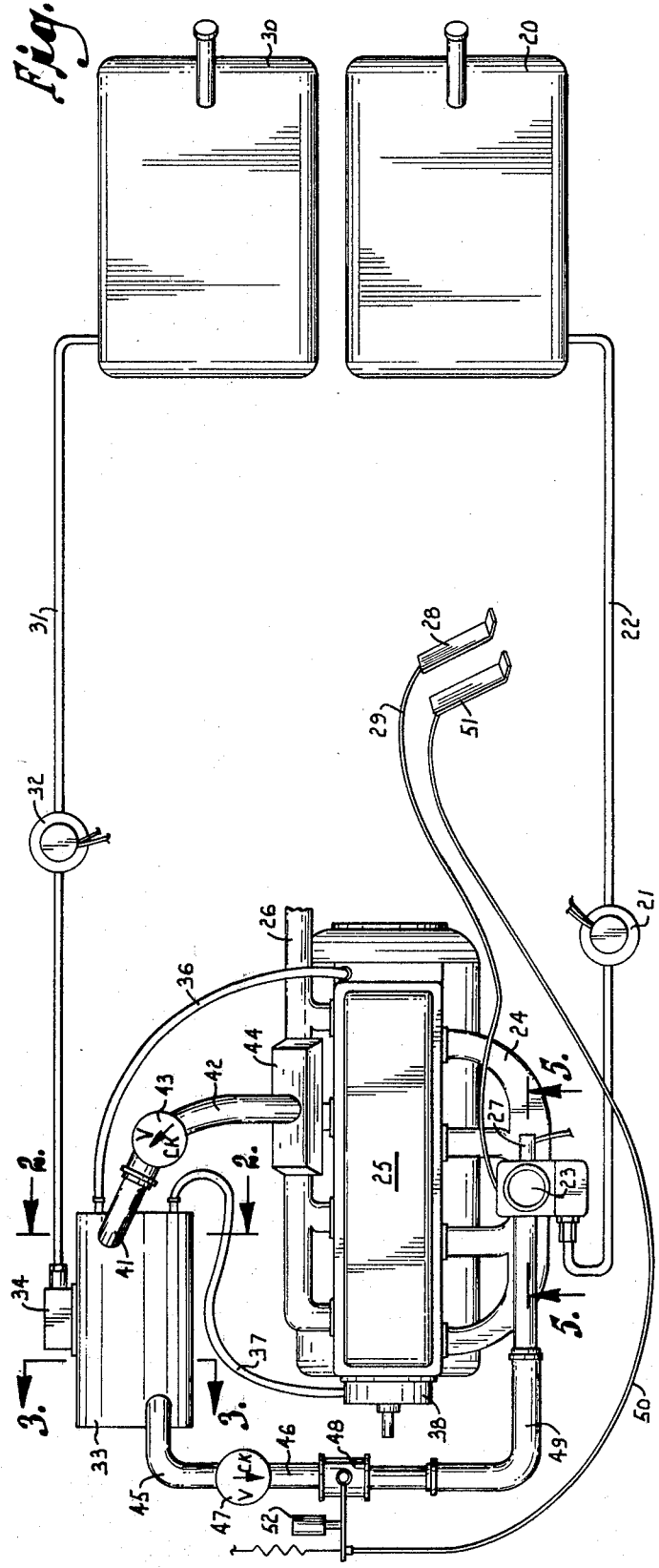
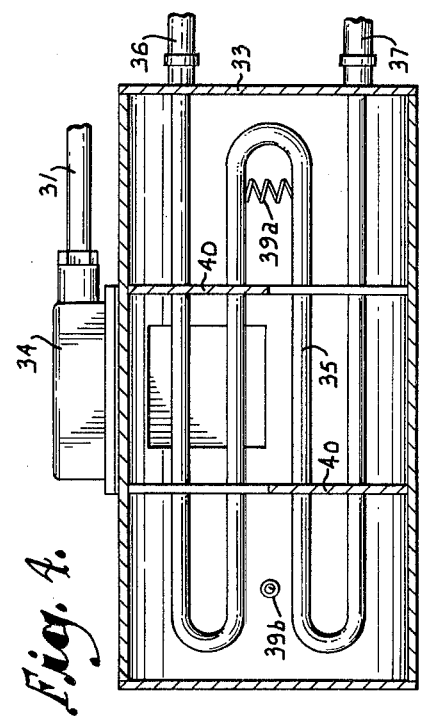
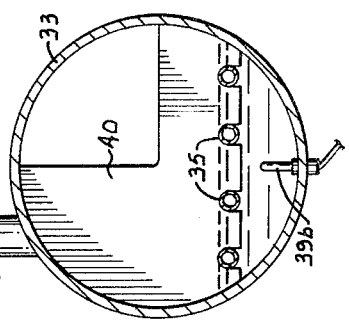
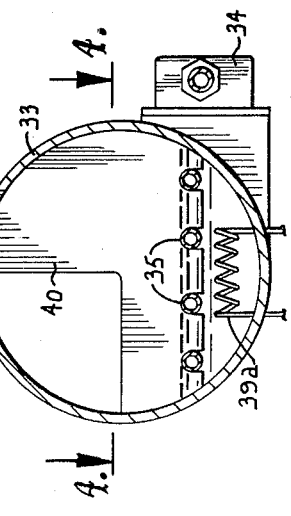

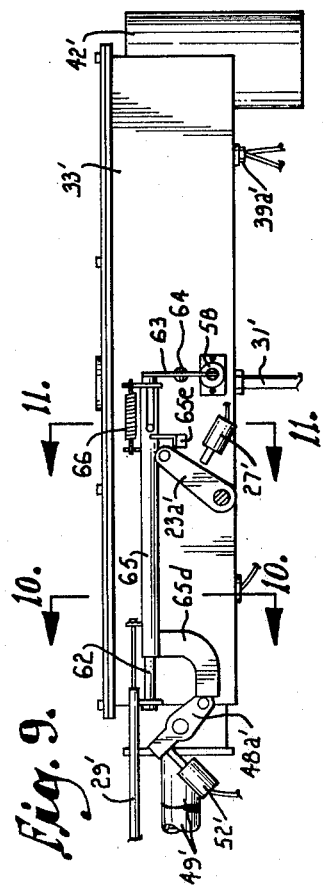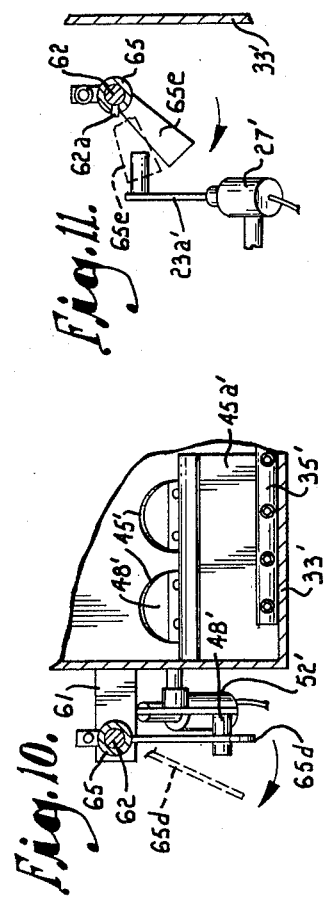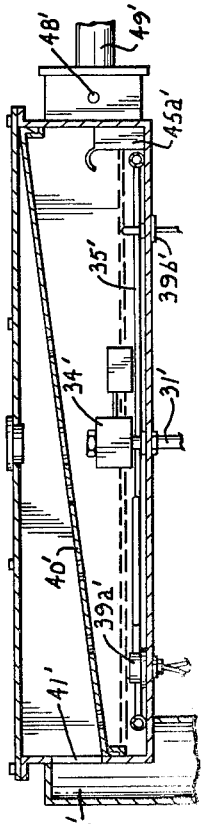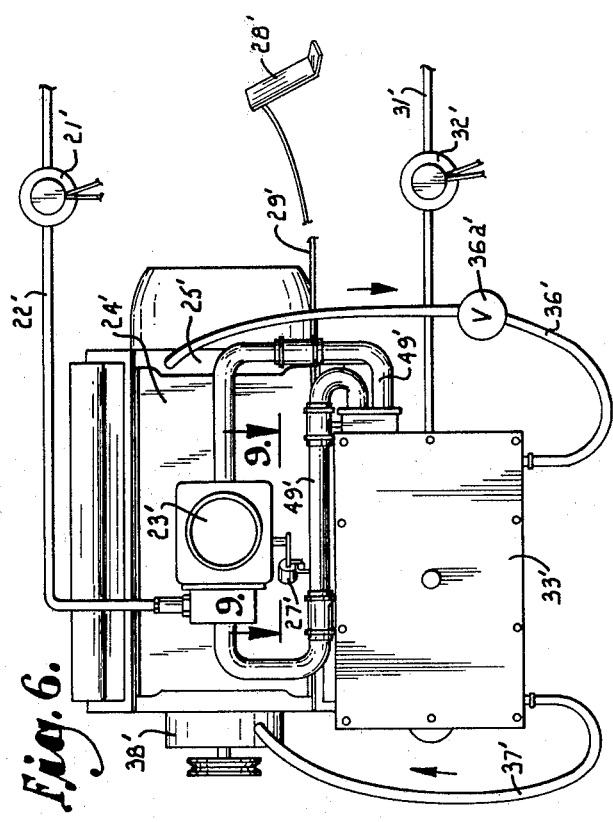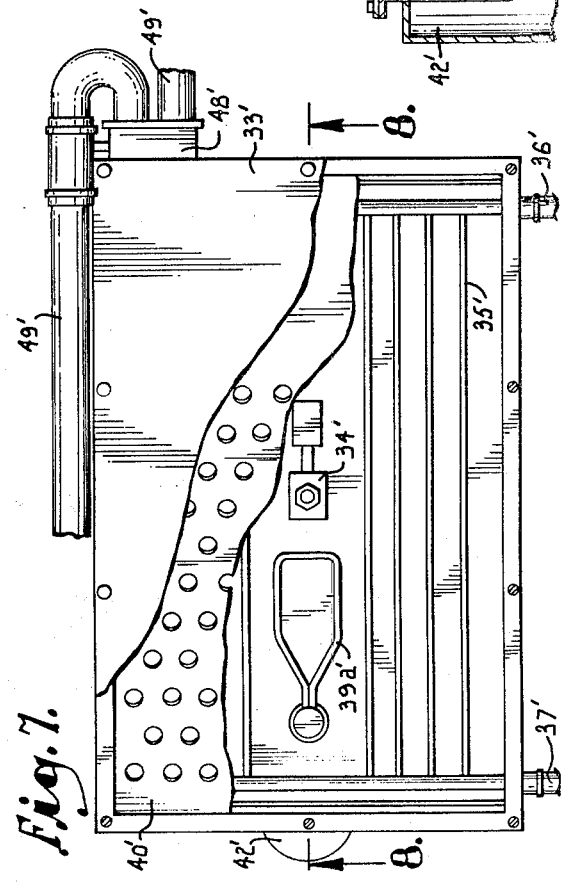

DUAL FUEL SYSTEM FOR AUTOMOBILES

BACKGROUND AND SUMMARY OF THE INVENTION

This invention relates to a dual fuel system for automobiles. More precisely, the invention relates to an automobile equipped to interchangeably operate with a conventional petroleum fuel system and with a non-petroleum fuel system.

With our domestic oil reserves in precariously short supply, increasing attention has been focused on an energy crisis. Gasoline for automobiles of course represents a significant use of petroleum based products and is a likely target for energy reform. Gasoline conservation, however, has been suggested as a key element of energy reform aided by proposed conservation incentives such as penalty tax on automobiles with poor fuel efficiency and increased tax on gasoline itself. These measures are predicated on the assumption our society is inextricably linked to gasoline as an automobile fuel source. An alternative is to forsake this reasoning and seek a non-petroleum fuel, such as alcohol, for which the technology and raw materials exist to produce an abundant domestic supply.

Others, notably those involved in professional auto racing, have in the past utilized alcohol for automotive fuel. Typically, an alcohol base formulation is fed to the carburetor of the engine and special adjustments of the carburetor permit only the use of that particular fuel. The automobile, normally of a highly specialized design, is built primarily for speed and represents an obviously different criteria from those usually contemplated for mass production cars intended for highway performance.

Likewise, others have proposed alcohol or mixtures of alcohol and water as a supplement to or additive for regular gasoline consumption. The intent has been to improve gasoline combustion and to clean up emissions. In such arrangements, however, the systems are again adjustment sensitive and are adapted primarily to a specific fuel mixture, the major constituent of which is still gasoline.

Accordingly, there is a need in the automotive industry for a dual fuel system which may interchangeably power automobiles on either a petroleum or non-petroleum fuel. The advantages of such a system are myriad. The user can power his automobile on the most readily available fuel and it would be unnecessary to curtail usage during periods of extreme petroleum shortage since an abundant supply of alcohol can be assured. Additional benefits are derived from alcohol operation. Not only does the consumer's fuel dollar stay within the domestic economy, engines operate at cooler temperatures to prolong engine life, plugs and engine are not subject to carbon deposits, engine oil remains cleaner and automobiles function virtually pollution free.

Furthermore, the user can select his fuel as determined by the appropriate economies. Widespread use of a dual fuel system in automobiles can also result in a residual benefit in providing competition between the petroleum and non-petroleum industries. The object of the present invention, therefore, is to meet the need for a dual fuel system in automobiles.

More specifically, an object of the invention is to provide a duel fuel system for an automobile which may be interchangeably powered by a petroleum fuel or a non-petroleum fuel.

Another object of the invention is to provide a dual fuel system for automobiles wherein the user may quickly and conveniently select an appropriate fuel based on prevailing availabilities and economies.

Another object of the invention is to provide a dual fuel system for automobiles wherein the substitute or second fuel system employing a non-petroleum fuel may be readily installed in existing automobiles without the necessity of adjustments to or alterations of the existing gasoline carburetion system. As a corollary of this object, the non-petroleum system may likewise be factory installed without design modifications to the conventional gasoline system.

An additional object of the invention is to provide a dual fuel system for automobiles wherein similar economies of operation are recognized with either systems. Of the cars tested thusfar employing the dual fuel system, comparable fuel consumption per mile is achieved. In other words, the miles per gallon achieved on gasoline remains unchanged by the convertion and the miles per gallon of alcohol consumed during operation of the substitute fuel system is virtually the same as that achieved by gasoline operation.

Yet another object of the invention is to provide a dual fuel system for automobiles wherein the substitute, non-petroleum fuel system bypasses the existing carburetion system of the automobile and delivers non-petroleum vapors directly to the intake manifold of the engine.

A further object of the invention is to provide a non-petroleum fuel system for an automobile which may be totally relied upon for powering the automobile, including initial starting thereof. In conjunction with this object, it is a further goal to provide means for vaporizing the non-petroleum fuel independent of the conventional gasoline carburetion system.

Other and further objects of the invention, together with the features of novelty appurtenant thereto, will appear in the course of the following description of the drawings.

DESCRIPTION OF THE DRAWINGS

In the accompanying drawings, which form a part of the specification and are to be read in conjunction therewith, and in which like reference numerals are employed to indicate like parts in the various views:

FIG. 1 is a top plan view, partially schematic, of an automobile engine equipped with a dual fuel system constructed in accordance with a first embodiment of my invention;

FIG. 2 is a sectional elevational view of the vaporization tank for the substitute, non-petroleum fuel system taken along line 2—2 of FIG. 1 in the direction of the arrows;

FIG. 3 is a sectional elevational view of the vaporization tank taken along line 3—3 of FIG. 1 in the direction of the arrows;

FIG. 4 is a sectional plan view of the vaporization tank taken along line 4—4 of FIG. 2 in the direction of the arrows;

FIG. 6 is a top plan view of an automobile engine equipped with a dual fuel system constructed in accordance with a second embodiment of my invention;

FIG. 7 is an enlarged top plan view of the vaporization tank for the substitute fuel system of the second embodiment with portions broken away to better illustrate the internal structural details;

FIG. 8 is a side sectional view taken alone line 8—8 of FIG. 7 in the direction of the arrows;

FIG. 9 is a side elevational view of the mechanical linkage for alternatively selecting the fuel system as taken along line 9—9 of FIG. 6 in the direction of the arrows;

FIG. 10 is a fragmentary sectional view taken along line 10—10 of FIG. 9 in the direction of the arrows;

FIG. 11 is a fragmentary sectional view taken along line 11—11 of FIG. 9 in the direction of the arrows;

Figure 13:
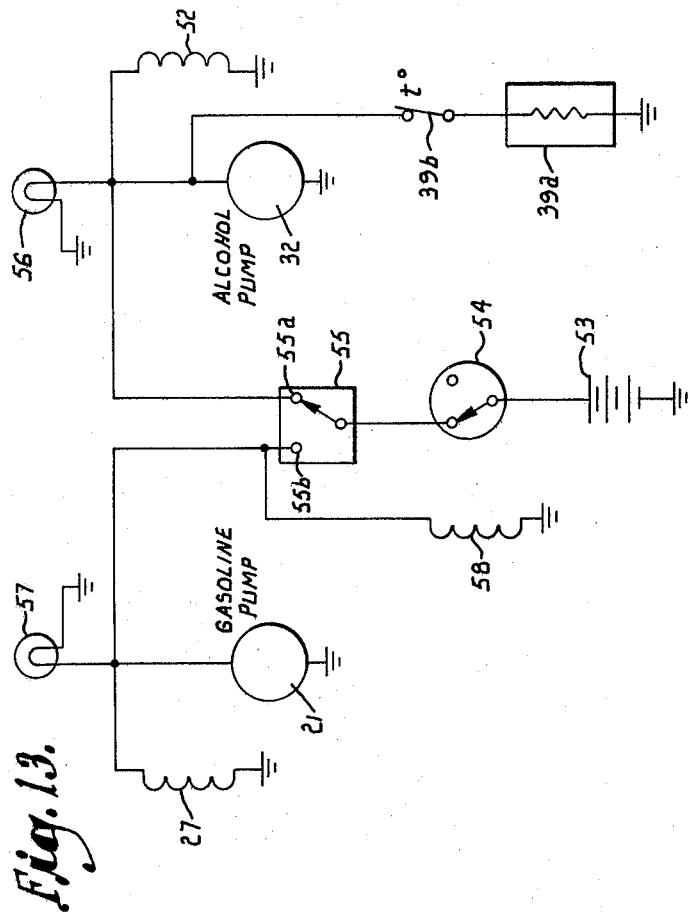
FIG. 13 is a schematic diagram illustrating the electrical controls for the dual fuel system.
Figure 5:
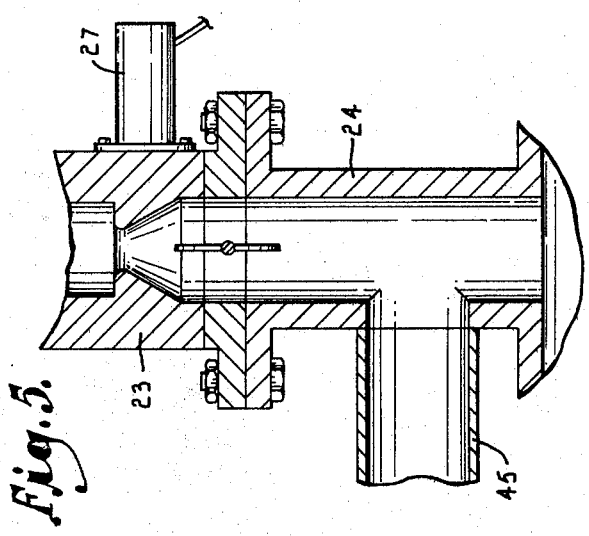
FIG. 5 is a fragmentary sectional view of the intake for non-petroleum vapors positioned beneath the conventional gasoline carburetion system as taken along line 5—5 of FIG. 1 in the direction of the arrows.
Figure 12:
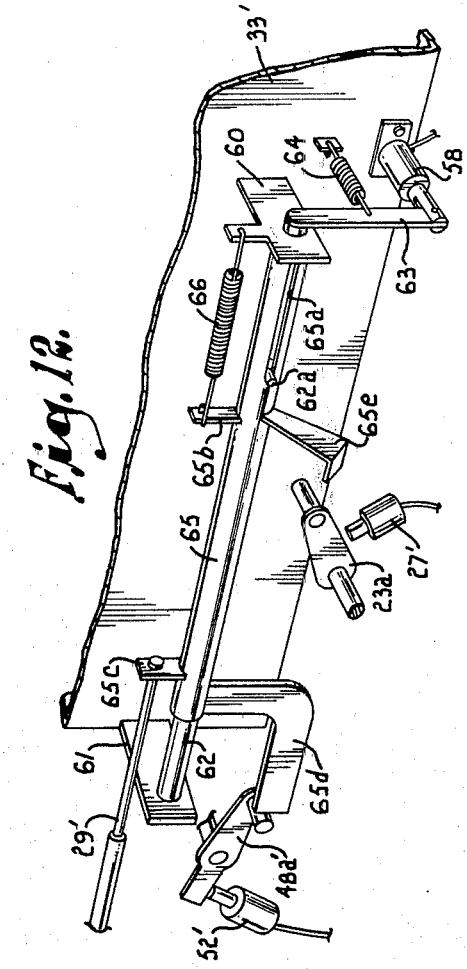
FIG. 12 is a perspective view of the linkage shown in FIGS. 9-11.

Turning to the drawings in greater detail, attention is initially focused on the first embodiment of the invention and particularly on FIG. 1. The petroleum fuel system includes a tank 20 for gasoline storage. Gasoline is delivered from the tank 20 by means of a fuel pump 21 interposed in a line 22 connected to the carburetor 23. The carburetor 23 is in turn connected to the intake manifold 24 of the engine 25; combustion gases flow from the engine 25 out the exhaust manifold 26. The carburetor 23 is equipped with a idle solenoid 27 to control gasoline flow when the engine is running at idle. When cruising, however, fuel flow is regulated by a first accelerator pedal 28 connected by a cable 29 to the carburetor 23.

Although the second or substitute fuel system is herein referred to as an alcohol system, it should be understood that any vaporizable and combustile non-petroleum fuel is contemplated for use, such as methyl alcohol, ethyl alcohol, acetone, ethyl ether and the like. The substitute fuel system includes an alcohol tank 30 for storing the non-petroleum liquid fuel which is delivered via line 31 by means of a fuel pump 32 to a vaporization chamber 33 equipped with a liquid level control 34.

In the first embodiment, the vaporization chamber 33 is in the form of a horizontally disposed cylindrical tank. Fitted within the bottom of the tank 33 is a fluid coil 35. The coil 35 is connected by circulation lines 36 & 37 to the cooling fluid system of the engine 25 whereby hot cooling fluid flows from the engine 25 through line 36 into the coil 35 and is returned to the water pump 38 through line 37 for recirculation. Disposed beneath the fluid coil 35 is an electrical resistance heater 39a to warm the fuel during cold start conditions. The heater 39a is connected to a temperature sensitive switch 39b adapted to sense the temperature of the liquid fuel in the bottom of the tank 33 and to turn off the heater 39a when a preselected temperature is reached.

The vapor space or upper region of the tank 33 is baffled with partitions 40 and is further fitted with an air intake port 41 which is connected by a pipe 42 (which may contain an optional check valve 43) to a hood 44 positioned above the exhaust manifold 26 of the engine 25 for the intake of warm air. Alternatively, the hood 44 may be omitted and ambient air employed. The air intake members are of sufficient size to prevent the formation of a vacuum within the tank 33. The tank 33 also includes a vapor exhaust 45 disposed in the upper region of the tank at the end opposite the air intake port 41. The vapor exhaust 45 is connected by a line 46 including a one-way check valve 47 to a butterfly valve 48 for adjustably varying the flow of vapor through the supply line 49 connected to the intake manifold 24 intermediate the engine 25 and the carburetor 23. The butterfly valve 48 is controlled by a spring biased cable 50 (normally biasing the butterfly valve closed) connected to a second accelerator pedal 51 referred to as the alcohol accelerator. To idle the engine 25, the butterfly valve 48 is also connected to an idle solenoid 52 which slightly opens the valve 48 when the accelerator 51 is not depressed.

The control circuitry for the petroleum and non-petroleum fuel systems is schematically illustrated in FIG. 13. The automobile battery 53 is connected in the usual fashion to the ignition switch 54 which, when turned to the "on" position, is connected to a single pole, double throw fuel selector switch 55. The first output terminal 55a of the SPDT switch 55 closes the alcohol circuit to connect in parallel the alcohol pump 32, the idle solenoid 52, an indicator lamp 56 and the heater 39a with its serially connected temperature switch 39b. The second terminal 55b of the SPDT switch 55 closes the gasoline circuit to connect in parallel the pump 21, idle solenoid 27, an indicator lamp 57 and fuel selection solenoid 58'. In the first embodiment, however, the fuel selection solenoid 58' is omitted and its function will be described in the second embodiment of the invention. It will be understood that the fuel selector switch 55 and indicator lamps 56 & 57 (each appropriately labeled) may be located within the driver's compartment of the car for the convenience of the operator.

In operation, the dual fuel system of the first embodiment of the invention functions in the following manner. The operator first chooses the fuel for powering the automobile. Assuming gasoline is to be utilized, the fuel selector switch 55 is positioned to close the gasoline circuit and the car may then be started. Idle solenoid 27 causes sufficient fuel to be delivered through the carburetor 23 to maintain the engine 25 at idle. When travelling, however, gas accelerator 28 regulates the flow of gasoline to the engine 25 in the conventional manner. Alternatively, if the non-petroleum fuel system is to be employed, the selector switch 55 is positioned to close the alcohol circuit. Assuming a "cold" start, the heater 39a in the bottom of tank 33 warms the alcohol until a preselected temperature is reached (for example, 110° F.) at which time the temperature sensing switch 39b open circuits the connection to the heater 39a. Sufficient alcohol vapors are then present in order to start the engine 25. During idle, solenoid 52 slightly opens the butterfly valve 48 to admit vapors from the tank 33 through the associated connecting lines to the intake manifold 24 of the engine 25. When travelling, alcohol accelerator 51 is depressed to regulate the flow of mixed air and alcohol vapors through the butterfly valve 48 to the engine by the draft created through the tank 33. Hot cooling fluid from the engine 25 passes through line 36 into the coil 35 of the tank 33 to continually warm the liquid alcohol supplied by pump 32 with the level in the tank being regulated by the level control 34. From the coil 35, the cooling fluid returns to the water pump 38 through line 37 and is again circulated through the engine 25.

Attention is now focused on the second embodiment of the invention utilizing a single accelerator for control of both fuel systems and reference is initially made to FIG. 6. Prime numerals are generally employed to indicate elements similar to the first embodiment. The petroleum fuel system includes a tank (not shown) for gasoline storage. Gasoline is delivered from the tank by means of a fuel pump 21' disposed in a line 22' connected to the carburetor 23'. The carburetor 23' is in turn connected to the intake manifold of the engine 25'. The carburetor 23' is equipped with an idle solenoid 27' acting against the carburetor advance lever 23a' to control gasoline flow when the engine is running at idle. When cruising, however, fuel flow is regulated through the carburetor 23' by an accelerator pedal 28' connected by a cable 29' to the carburetor 23' by means of control linkage to later be described.

The substitute fuel system includes an alcohol tank (not shown) for storing a non-petroleum liquid fuel which is delivered by a line 31' by means of a fuel pump 32' to the vaporization chamber 33' equipped with a liquid level control 34'.

In the second embodimemt, the vaporization chamber 33' is in the form of a horizontally disposed rectangular tank. Fitted within the bottom of the tank 33' is a fluid coil 35' connected by circulation lines 36' & 37' to the cooling fluid system of the engine 25' whereby hot cooling fluid flows from the engine 25' through line 36' into the coil 35' and is returned to the water pump 38' through line 37' for recirculation. An adjustable control valve 36a' may be installed in line 36' for regulating the flow of fluid from the engine to the coil 35'. Disposed in the bottom of tank 33' is an electrical resistance heater 39a' to warm the fuel during cold start conditions. The heater 39a' is connected to a temperature sensitive switch 39b' adapted to sense the temperature of the liquid fuel in the bottom of the tank 33' and to turn off the heater 39a' when a preselected temperature is reached.

The vapor space of the tank 33' is baffled with an inclined, foraminous partition 40'. One end of the tank 33' is bored with one or more air intake ports 41' disposed above the lower end of the inclined partition 40' to receive ambient air from a conduit 42' open to the atmosphere. The air intake is of sufficient size to admit an adequate supply of ambient air to the tank 33' to prevent the formation of a vacuum within the tank during operation of the engine.

At the end of the tank 33' opposite the air intake port 41' are bored exhaust openings 45' which are isolated from the liquid fuel in the tank 33' by a weir 45a'. Associated with the exhaust openings 45' are a pair of butterfly valves 48' operating in unison to adjustably vary the flow of air and alcohol vapors through supply lines 49' connected to the intake manifold 24' intermediate the engine 25' and the carburetor 23'.

With reference to FIGS. 9–12, the linkage connected to the accelerator cable 29' to control operation of the carburetor 23' and butterfly valves 48' is now to be described in detail. Secured to the side of the tank 33' are a pair of brackets 60 & 61 which carry, for limited pivotal movement, a control rod 62. One end of the control rod 62 projects through bracket 60 and is rigidly attached to a downwardly extending arm 63. The lower end of the arm 63 is connected to a fuel selection solenoid 58' and, intermediate its ends, the arm 63 is connected to a spring 64 from the wall of tank 33' to pull the arm toward the tank. Carried on the rod 62 for sliding longitudinal movement relative thereto is a tubular sleeve 65 having a longitudinal slot 65a from one end thereof into which projects a fixed pin 62a from the rod 62. A spring 66 interconnecting the bracket 60 with an ear 65b attached to the sleeve 65 urges the end of the sleeve 65 to engagement with the bracket 60. The sleeve 65 is also equipped with a second ear 65c to which is coupled the accelerator cable 29'. Depression of the accelerator pedal 28' causes the cable 29' to pull the sleeve 65 forward against the influence of spring 66 in sliding longitudinal movement along rod 62. Further attached to sleeve 65 is an alcohol actuator arm 65d to bear against, in one rotative position of the sleeve 65 as shown in the full line view of FIG. 10, the control arm 48a' of the butterfly valves 48'. An alcohol idle solenoid 52' additionally engages the butterfly control arm 48a'. A gasoline actuator arm 65e is attached to the sleeve 65 to bear against, in the alternative rotative position of the sleeve 65 shown in the broken line view of FIG. 11, the carburetor advance lever 23a' controlling operation of the carburetor 23'.

The control circuitry for the second embodiment is the same as that described with reference to FIG. 13 with the fuel selection solenoid 58' included. Prime reference numerals indicate elements similar to those of FIG. 13, but applied in the second embodiment. Accordingly, the gasoline circuit includes the pump 21', idle solenoid 27', lamp 57' and fuel selection solenoid 58' connected in parallel to terminal 55b' of SPDT switch 55' coupled to the ignition switch 54' and battery 53'. The alcohol circuit connected to terminal 55a' in parallel similarly includes pump 32', idle solenoid 52', lamp 56' and heater 39a' with associated temperature switch 39b'.

In operation, the dual fuel system of the second embodiment of the invention functions in the following manner. The operator first chooses the fuel for powering the automobile. Assuming gasoline is to be utilized, the fuel selector switch 55' is positioned to close the gasoline circuit which actuates solenoid 58' to pivotally move the arm 63 against the influence of spring 64 which also pivots rod 62. Sleeve 65 is carried in this same rotative movement by virtue of pin 62a within slot 65a causing sleeve 65 to pivot to an outboard position in which the gas actuator lever 65e is aligned to bear against the carburetor advance lever 23a' (broken line view of FIG. 11) and alcohol actuator lever 65d is rotated out of alignment with the butterfly control lever 48a' (broken line view of FIG. 10). The car may then be started in conventional fashion and idle solenoid 27' extends against advance arm 23a' when the acclerator 28' is undepressed to cause sufficient fuel to be delivered through the carburetor 23' to maintain the engine 25' at idle. When travelling, however, accelerator 28' is depressed to pull the sleeve 65 forward and advance the carburetor lever 23a' engaged by gas lever 65e.

Alternatively, if the non-petroleum fuel system is to be employed, the selector switch 55' is positioned to close the alcohol circuit. Since fuel selector solenoid 58' is not energized, spring 64 urges the arm 63 to the inboard position in which the gas actuator 65e is out of alignment with the carburetor advance lever 23a' and the alcohol lever 65d is in alignment with the butterfly control lever 48a'. Assuming a "cold" start, the heater 39a' in the bottom of tank 33' warms the alcohol until a preselected temperature is reached at which time the temperature sensing switch 39b' open circuits the connection to the heater 39a'. Sufficient alcohol vapors are then present in order to start the engine 25'. During idle, solenoid 52' extends to engage butterfly control lever 48a' to slightly open the butterfly valves 48' to admit vapors from the tank 33' through the connecting lines 49' to the intake manifold 24' of the engine 25'. When travelling, the accelerator 28' is depressed to pull the sleeve 65 against the influence of spring 66 to advance the butterfly control lever 48a' and thereby open the butterfly valves 48' to regulate the flow of mixed air and alcohol vapors to the engine 25' by the draft created through the tank 33'. Hot cooling fluid from the engine 25' passes through line 36' into the coil 35' of the tank 33' to continually warm the liquid alcohol supplied by pump 32' with the level in the tank being regulated by the level control 34'. From the coil 35', the cooling fluid returns to the water pump 38' through line 37' and is again circulated through the engine 25'.

When operating on alcohol, with either embodiment of the invention, the intake stroke of the pistons within the cylinders of the engine pulls the air and alcohol vapors into the cylinders from the intake manifold connected to the alcohol vapor tank. This induced flow of vapor is achieved by supplying ambient or warm air at the end of the tank opposite the alcohol exhaust. The sizing of the air supply members may vary greatly and will in part depend upon the size and configuration of the alcohol tank. Nevertheless, the general intent is to provide a vapor tank maintained substantially at atmospheric pressure with sufficient air draft to create turbulence within the vapor space of the tank to facilitate the vapor flow to the engine.

From the foregoing it will be seen that this invention is one well adapted to attain all ends and objects hereinabove set forth, together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A dual fuel system for an internal combustion engine having an intake manifold, said system comprising:
    a first liquid storage tank for containing a petroleum fuel;
    first delivery means connected to said first storage tank for supplying liquid fuel therefrom;
    a carburetor interconnecting said first delivery means and said intake manifold to measuringly supply a mixture of air and petroleum fuel to said engine;
    a second liquid storage tank for containing a non-petroleum fuel;
    second delivery means connected to said second storage tank for supplying liquid fuel therefrom;
    a vaporization chamber connected to said second delivery means to receive liquid non-petroleum fuel in the bottom thereof, said chamber equipped with level control means regulating the amount of liquid fuel within said chamber to define thereabove a vapor space;
    a heating coil disposed within the bottom of said vaporization chamber for warming liquid fuel delivered thereto by said second delivery means to thereby generate non-petroleum fuel vapors;
    an air intake port communicating with the vapor space of said chamber to maintain substantially atmospheric pressure within said chamber;
    a vapor delivery conduit interconnecting the vapor space of said chamber directly with the intake manifold of the engine;
    valve means associated with said vapor delivery conduit to measuringly supply the flow of mixed air and non-petroleum fuel vapors to the intake manifold; and
    alternatively selectable, variable actuator means coupled to said carburetor for adjustably regulating the flow of aair and petroleum fuel mixture to the engine and coupled to said valve means for adjustably regulating the flow of air and non-petroleum fuel vapors to the engine, whereby one of the two fuels may be selected for operation of the engine.

2. The fuel system as in claim 1, said variable actuator means comprising a first accelerator linked to said carburetor to controllingly vary the flow of air and petroleum fuel mixture to the engine, and a second accelerator linked to said valve means to controllingly vary the flow of air and non-petroleum fuel vapors to the engine.

3. The fuel system as in claim 1, said variable actuator means comprising an accelerator with linkage means for alternatively and selectively coupling said accelerator to said carburetor to controllingly vary the flow of air and petroleum fuel mixture to the engine and to said valve means to controllingly vary the flow of air and non-petroleum fuel vapors to the engine.

4. The fuel system as in claim 1, including electrical control circuitry having a fuel selection switch to alternatively activate said first delivery means associated with said petroleum fuel and said second delivery means associated with said non-petroleum fuel.

5. The fuel system as in claim 1, including an electrical resistance heater disposed in the bottom of said vaporization chamber to maintain the temperature of the liquid non-petroleum fuel above a preselected temperature.

6. The fuel system as in claim 1, said engine having a cooling fluid circulation system and said heating coil connected to said circulation system to receive hot fluid from the engine and to return fluid back to the engine.

* * * * *